(12) United States Patent
Ma et al.

(10) Patent No.: US 12,663,379 B2
(45) Date of Patent: Jun. 23, 2026

(54) OPTICAL DETECTION DEVICE, DETECTION METHOD AND DEVICE, ELECTRONIC DEVICE, AND STORAGE MEDIUM

(71) Applicant: CONTEMPORARY AMPEREX TECHNOLOGY (HONG KONG) LIMITED, Hong Kong (CN)

(72) Inventors: Lin Ma, Ningde (CN); Chao Wu, Ningde (CN); Yunlong Huang, Ningde (CN); Man Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 45 days.

(21) Appl. No.: 18/523,652

(22) Filed: Nov. 29, 2023

(65) Prior Publication Data

US 2024/0201097 A1 Jun. 20, 2024

Related U.S. Application Data

(63) Continuation of application No. PCT/CN2023/084110, filed on Mar. 27, 2023.

(30) Foreign Application Priority Data

Dec. 14, 2022 (CN) .......................... 202211602935.8

(51) Int. Cl.
 *G01N 21/88* (2006.01)
 *G01N 21/95* (2006.01)
(52) U.S. Cl.
 CPC ..... *G01N 21/8806* (2013.01); *G01N 21/9501* (2013.01)

(58) Field of Classification Search
 CPC .................................................. G01N 21/8806
 See application file for complete search history.

(56) References Cited

U.S. PATENT DOCUMENTS 5,039,868 A 8/1991 Kobayashi et al.
5,105,149 A * 4/1992 Tokura ................. G01R 31/308
 348/126
(Continued)

FOREIGN PATENT DOCUMENTS

CN 102218406 A 10/2011
CN 102735611 A 10/2012
(Continued)

OTHER PUBLICATIONS

The China National Intellectual Property Administration (CNIPA) First Office Action For 202211602935.8 Feb. 1, 2023 20 Pages (including translation).
(Continued)

*Primary Examiner* — Thanh Luu
(74) *Attorney, Agent, or Firm* — ANOVA LAW GROUP, PLLC

(57) ABSTRACT

An optical detection device includes a detection workspace, a first image acquisition device, a second image acquisition device, a detection light source, and a conveyor. The detection workspace is configured to hold a target workpiece under detection. The first image acquisition device is configured to acquire an image of the target workpiece along a first direction. The second image acquisition device is configured to acquire an image of the target workpiece along a second direction different from the first direction. The detection light source is configured to provide detection light for the first image acquisition device and the second image acquisition device. The conveyor is configured to convey the target workpiece into or out of the detection workspace. An optical axis of at least a part of the detection light provided
(Continued)

by the detection light source is coaxial with an optical axis of the first image acquisition device.

17 Claims, 6 Drawing Sheets

(56)                    References Cited

U.S. PATENT DOCUMENTS

| | | | | |
|---|---|---|---|---|
| 5,461,417 | A | * | 10/1995 | White .................... H04N 23/74 |
| | | | | 348/125 |
| 5,686,994 | A | * | 11/1997 | Tokura ............... H05K 13/0815 |
| | | | | 348/126 |
| 6,005,965 | A | * | 12/1999 | Tsuda ..................... G01N 21/88 |
| | | | | 250/559.08 |
| 2010/0060895 | A1 | * | 3/2010 | Oshima .............. G01N 21/9501 |
| | | | | 356/369 |
| 2017/0038197 | A1 | * | 2/2017 | Lee ....................... G01B 11/245 |
| 2019/0268522 | A1 | * | 8/2019 | Hayashi ................ G06T 7/0004 |
| 2021/0072113 | A1 | | 3/2021 | Liu et al. |
| 2023/0368367 | A1 | * | 11/2023 | Zeng ................. H01M 10/4285 |
| 2024/0142381 | A1 | * | 5/2024 | Ichihara ................... B07C 5/342 |

FOREIGN PATENT DOCUMENTS

| | | | |
|---|---|---|---|
| CN | 103884651 | A | 6/2014 |
| CN | 108413873 | A | 8/2018 |
| CN | 109991166 | A | 7/2019 |
| CN | 210775273 | U | 6/2020 |
| CN | 111693546 | A | 9/2020 |
| CN | 112240887 | A | 1/2021 |
| CN | 112461260 | A | 3/2021 |
| CN | 112748120 | A | 5/2021 |
| CN | 113376177 | A | 9/2021 |
| CN | 114018941 | A | 2/2022 |
| CN | 114740013 | A | 7/2022 |
| CN | 115220288 | A | 10/2022 |
| CN | 115266577 | A | 11/2022 |
| CN | 217717531 | U | 11/2022 |
| CN | 115436288 | A | 12/2022 |
| CN | 115656197 | A | 1/2023 |

| | | | |
|---|---|---|---|
| EP | 2685242 | A1 | 1/2014 |
| EP | 4033227 | A1 | 7/2022 |
| JP | 2003272605 | A | 9/2003 |
| JP | 2015125089 | A | 7/2015 |
| KR | 101230396 | B1 | 2/2013 |
| WO | 2015014593 | A1 | 2/2015 |
| WO | 2021203650 | A1 | 10/2021 |

OTHER PUBLICATIONS

The China National Intellectual Property Administration (CNIPA) The second Office Action For 202211602935.8 Feb. 13, 2023 19 Pages (including translation).

The China National Intellectual Property Administration (CNIPA) Rejection Decision For 202211602935.8 Feb. 28, 2023 11 Pages (including translation).

The World Intellectual Property Organization (WIPO) International Search Report for No. PCT/CN2023/084110 Jul. 28, 2023 7 Pages (including translation).

Jiale Xu et al., "Study on detection method of bearing surface defect based on line scanning technology", Nov. 2022, p. 88-94, vol. 48 No. 11, China Academic Journal Electronic Publishing House.

Ping Feng et al., "Digital Image Processing Technology for PCB Automatic Optical Detection", Oct. 2018. p. 30-36., Xi'an Jiaotong University Press.

"Editorial Department of Shanghai Science & Technology Yearbook ", Sep. 1999. p. 1-31, p. 225-227, Shanghai Science Popularization Press.

Zhenshan Lei et al., LabVIEW Advanced Programming and Virtual Instrument Engineering Applications (Revised Edition). Aug. 2013. p. 1-8, p. 242-244, China Railway Publishing House.

The European Patent Office (EPO) The Partial Supplementary European Search Report for Application 23804567.8 Sep. 10, 2024 6 Pages.

The European Patent Office (EPO) The Extended European Search Report for Application No. 23804567.8 Feb. 4, 2025 11 Pages.

The European Patent Office (EPO) Communication pursuant to Article 94(3) EPC for Application No. 23804567.8 Feb. 19, 2026 8 Pages.

* cited by examiner

1000

100

OPTICAL DETECTION DEVICE, DETECTION METHOD AND DEVICE, ELECTRONIC DEVICE, AND STORAGE MEDIUM

CROSS-REFERENCE TO RELATED APPLICATIONS

This application is a continuation of International Application No. PCT/CN2023/084110, filed on Mar. 27, 2023, which claims priority to Chinese Patent Application No. 202211602935.8, filed on Dec. 14, 2022 and entitled "OPTICAL DETECTION DEVICE, DETECTION METHOD AND DEVICE, ELECTRONIC DEVICE, AND STORAGE MEDIUM", which are incorporated herein by reference in their entirety.

TECHNICAL FIELD

This application relates to the technical field of batteries, and in particular, to an optical detection device, a cell electrode post detection method, a cell electrode post detection device, an electronic device, and a computer-readable storage medium.

BACKGROUND

Energy conservation and emission reduction are key to sustainable development of the automobile industry. Electric vehicles have become an important part of the sustainable development of the automobile industry by virtue of energy saving and environmental friendliness. Battery technology is crucial to development of electric vehicles.

During preparation of a battery, defects such as surface scratches, dimples, stains, and surface wire drawing may occur on surfaces of parts of the battery. Therefore, there is a need to inspect the battery or the parts of the battery to find various defects in time and prevent defective products from entering subsequent processes.

SUMMARY

This application aims to solve at least one of technical problems in the related art. In view of the facts above, an objective of this application is to disclose an optical detection device, a cell electrode post detection method, a cell electrode post detection device, an electronic device, and a computer-readable storage medium to improve accuracy and efficiency of battery detection.

An embodiment in a first aspect of this application provides an optical detection device, including a detection workspace, a first image acquisition device, a second image acquisition device, a detection light source, and a conveyor. The detection workspace is configured to hold a target workpiece under detection. The first image acquisition device is configured to acquire an image of the target workpiece along a first direction. The second image acquisition device is configured to acquire an image of the target workpiece along a second direction. The detection light source is configured to provide detection light for the first image acquisition device and the second image acquisition device. The conveyor is configured to convey the target workpiece into or out of the detection workspace. The first direction is different from the second direction. An optical axis of at least a part of the detection light provided by the detection light source is coaxial with an optical axis of the first image acquisition device.

In the technical solution according to this embodiment of this application, by providing a light source coaxial with the optical axis of the image acquisition device, the defects on the surface of the target workpiece under detection can be recognized more accurately through the image, thereby improving the accuracy of optical detection. In addition, due to a desirable imaging effect and high accuracy of the detection performed with the coaxial light source, the detection time spent by the target workpiece in staying in the detection workspace is greatly reduced. In this way, the optical detection device can implement a flying shot of the target workpiece, thereby maximally keeping abreast of the production progress and increasing productivity. The images of different surfaces of the target workpiece can be acquired by the image acquisition devices arranged in different directions, thereby facilitating comprehensive detection of the quality of a plurality of surfaces of the target workpiece and improving the detection efficiency.

By means of the conveyor, the target workpiece can be automatically conveyed into and out of the detection workspace. In addition, the conveyor coordinate with the first image acquisition device, the second image acquisition device, and the detection light source to implement flying-shot detection without requiring the target workpiece to statically stand in the detection workspace during the shooting, thereby improving the detection efficiency.

In some embodiments, the detection light source includes a first sub-light source and a second sub-light source. The first sub-light source is configured to provide the detection light coaxial with the optical axis of the first image acquisition device. The second sub-light source is configured to provide the detection light incident on a lateral surface of the target workpiece. The detection light emitted by the second sub-light source and incident on the lateral surface of the target workpiece can supplement the light for the second image acquisition device, thereby improving the imaging quality of the second image acquisition device, and in turn, increasing accuracy of recognizing surface defects of the target workpiece.

In some embodiments, the first sub-light source includes a light output port. The second sub-light source is located on a side of the first sub-light source, the side containing the light output port. The second sub-light source contains a transmissive hole. The transmissive hole is made corresponding to the light output port of the first sub-light source to allow passage of the detection light emitted by the first sub-light source. Such a structural form can implement integration of the first sub-light source and the second sub-light source, so that the structure is more concise and compact, occupies a smaller space, and can reduce the workload in subsequent installation and debugging.

In some embodiments, the second sub-light source includes an end cap and a light-emitting element. The end cap is fixedly connected to the side of the first sub-light source, the side containing the light output port. A transmissive hole is made on the end cap. The light-emitting element is fixed onto a lateral surface of the end cap, the lateral surface being away from the first sub-light source. The light-emitting element is located on a periphery of the transmissive hole. The light-emitting element of the second sub-light source is directly fixedly connected to the first sub-light source by the end cap, thereby making the structural form of the detection light source more compact, shortening the distance between the light-emitting elements in the two sub-light sources, and facilitating the wiring arrangement of the detection light source.

In some embodiments, the detection workspace includes a first detection workspace and a second detection workspace arranged at intervals. The first image acquisition device and the first sub-light source are located above the first detection workspace to acquire the image of the target workpiece in the first detection workspace. The second image acquisition device and the second sub-light source are disposed around the second detection workspace to acquire the image of the target workpiece in the second detection workspace. By disposing two detection workspaces to acquire the images of the target workpiece in two different directions, the shooting of images in the two directions can be controlled independently, thereby preventing the imaging effect from being impaired by mutual interference between the light sources. The two image acquisition devices shoot images separately and independently, thereby further reducing the time spent by the target workpiece in staying in the detection workspace to meet the need of shooting. In this way, the conveyance speed is faster to enable flying-shot detection, thereby shortening the detection time and improving productivity.

In some embodiments, the optical detection device includes a plurality of the second image acquisition devices. The plurality of the second image acquisition devices are disposed at intervals around the detection workspace. The plurality of second image acquisition devices that shoot images separately can implement full-range detection on the lateral surface of the target workpiece, so that the defects of the target workpiece can be determined more comprehensively and more accurately, and the accuracy of detection is improved.

In some embodiments, the second sub-light source includes a plurality of bar-shaped light sources that are in one-to-one correspondence with the second image acquisition devices and arranged at intervals. By arranging a plurality of bar-shaped light sources in one-to-one coordination with the second image acquisition devices, it is ensured that each second image acquisition device can photograph the desired detection light, thereby ensuring the imaging quality of each second image acquisition device.

In some embodiments, the second sub-light source is a ring-shaped light source. A diameter of the ring-shaped light source is larger than a preset diameter. By making the second sub-light source be a ring-shaped light source to provide the detection light to the lateral surface of the target workpiece, the man-hours for mounting and debugging of the light source are reduced and the detection efficiency is improved on the basis of ensuring desirable quality of the lateral image.

In some embodiments, the optical axis of the first image acquisition device is perpendicular to a plane in which the detection workspace is located. In this way, the light from a top surface can enter the first image acquisition device as much as practicable after being reflected, thereby avoiding a poor effect of feature visualization caused by an insufficient luminous flux, improving the image quality, reflecting various subtle defects of the top surface more clearly, and in turn, improving the accuracy of detection.

In some embodiments, a mounting angle between the optical axis of the second image acquisition device and a plane in which the detection workspace is located is adjustable. The mounting angle is greater than or equal to 10° and less than or equal to 45°. Controlling the mounting angle to fall between 10° and 45° can implement flexible adjustment of the angle on the basis of ensuring relatively high light intensity of imaging. Therefore, the field-of-view can vary with the object under detection, and a desirable imaging effect can be achieved by performing adjustment based on the defect characteristics.

In some embodiments, the optical detection device further includes a 3D camera. The 3D camera is configured to acquire a 3D image of the target workpiece. The 3D camera can enrich parameter information of a surface defect of the cell electrode post in the height direction, thereby enabling more accurate judgement on the impact caused by the defect of the cell electrode post to the quality of the battery, and improving the accuracy of detection.

An embodiment in a second aspect of this application provides a cell electrode post detection method. The method includes: acquiring an image of a cell electrode post by using the optical detection device disclosed above; recognizing the image and determining a defect parameter in the image; and determining a detection result of the cell electrode post based on the defect parameter. By recognizing the acquired image of the cell electrode post, the defect parameter indicative of a defect is determined, and the corresponding detection result is determined based on the defect parameter, so that the cell electrode post is detected efficiently and accurately.

In some embodiments, the recognizing the image and determining a defect parameter in the image include: locating the cell electrode post in the image; sorting out pixels of a defect region of the cell electrode post from the image to obtain a defect image; and determining the defect parameter based on the defect image, where the defect parameter includes at least one of a defect type, a defect size, or a defect gray value. By performing feature recognition on the image of the defect region of the cell electrode post, defect-related feature parameters can be obtained so that the defects can be determined accurately subsequently, thereby improving the accuracy of detecting the cell electrode post.

In some embodiments, the determining a detection result of the cell electrode post based on the defect parameter includes: determining a detection result corresponding to the defect parameter and related to the cell electrode post based on a preset correspondence between the defect parameter and the detection result. Based on the preset correspondence between the defect parameter and the detection result, the impact on the quality of the battery is determined based on the defect parameter obtained through image recognition. The criterion of determining is unified, thereby avoiding subjective misjudgment and improving the processing efficiency.

In some embodiments, the cell electrode post detection method further includes: excluding, in response to a detection result indicative of a defect, a battery cell that includes a defective cell electrode post. The detection result is output to an actuator. Subsequently, the actuator sorts the batteries based on the detection result, thereby preventing the defective batteries from entering subsequent processes.

An embodiment in a third aspect of this application provides a cell electrode post detection device. The cell electrode post detection device includes an optical detection device, an image recognition module, and a determining module. The optical detection device is the optical detection device according to any one of the foregoing embodiments. The optical detection device is configured to acquire an image of a cell electrode post. The image recognition module is configured to recognize the image of the cell electrode post acquired by the optical detection device. The determining module is configured to determine a detection result of the cell electrode post based on a recognition result of the image recognition module.

An embodiment in a fourth aspect of this application provides an electronic device. The electronic device includes: at least one processor; and a memory connected in communication with the at least one processor. The memory stores an instruction executable by the at least one processor. The instruction is executed by the at least one processor so that the at least one processor is enabled to perform the detection method according to any one of the foregoing embodiments.

An embodiment in a fifth aspect of this application provides a computer-readable storage medium on which a computer program is stored. When executed by a processor, the computer program implements the detection method according to any one of the foregoing embodiments.

The foregoing description is merely an overview of the technical solutions of this application. Some specific embodiments of this application are described below illustratively to enable a clearer understanding of the technical solutions of this application, enable implementation of the technical solutions based on the subject-matter hereof, and make the foregoing and other objectives, features, and advantages of this application more evident and comprehensible.

BRIEF DESCRIPTION OF DRAWINGS

Unless otherwise specified, the same reference numerals throughout a plurality of drawings represent the same or similar components or elements. The drawings are not necessarily drawn to scale. Understandably, the drawings merely depict some embodiments of this application, but are not to be intended as any limitation on the scope of this application. To describe the technical solutions of the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

6

Figure 1:
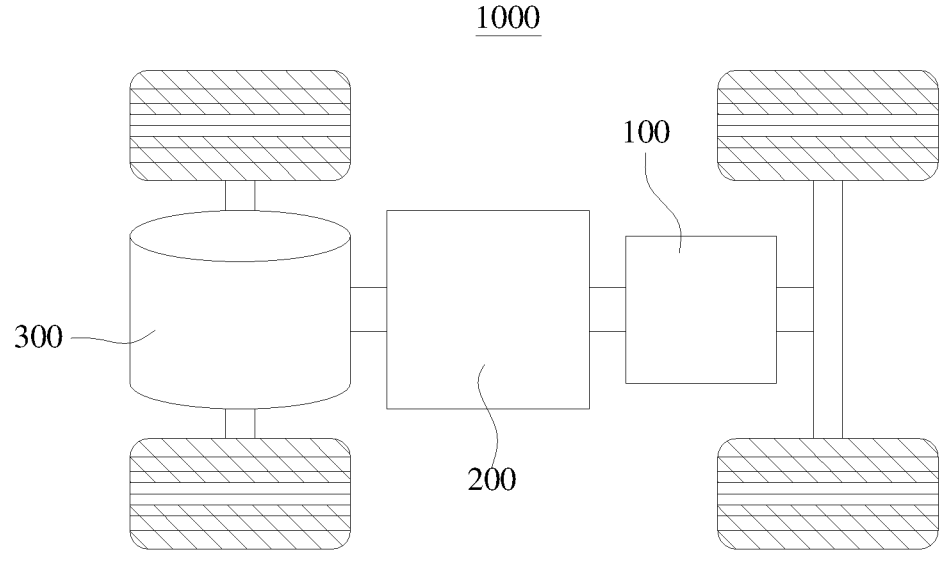
FIG. 1 is a schematic structural diagram of a vehicle according to some embodiments of this application.

LIST OF REFERENCE NUMERALS vehicle 1000;

battery 100, controller 200, motor 300;

box 10, first part 11, second part 12;

battery cell 20, cover plate 21, cell electrode post 21*a*, housing 22, electrode assembly 23, tab 23*a;* optical detection device 400, first image acquisition device 410, second image acquisition device 420, detection light source 430, conveyor 440;

detection workspace 401, first detection workspace 402, second detection workspace 403;

first camera 421, second camera 422, third camera 423, fourth camera 424;

first sub-light source 431, light-emitting element 4311, transflective beamsplitter 4312, reflective port 4313, light output port 4314;

second sub-light source 432, end cap 4321, transmissive hole 4322, light-emitting element 4323, first bar-shaped light source 4324, second bar-shaped light source 4325, third bar-shaped light source 4326, fourth bar-shaped light source 4327;

cell electrode post detection device 600, image recognition module 620, determining module 630;

first mounting angle α1, second mounting angle α2; first optical axis X1, second optical axis X2, third optical axis X3, detection light L1.

DETAILED DESCRIPTION OF EMBODIMENTS

Some embodiments of the technical solutions of this application are described in detail below with reference to the drawings. The following embodiments are merely intended as examples to describe the technical solutions of this application more clearly, but not intended to limit the protection scope of this application.

Unless otherwise defined, all technical and scientific terms used herein bear the same meanings as what is normally understood by a person skilled in the technical field of this application. The terms used herein are merely intended to describe specific embodiments but not to limit this application. The terms "include" and "contain" and any variations thereof used in the specification, claims, and brief description of drawings of this application are intended as non-exclusive inclusion.

In the description of the embodiments of this application, the technical terms "first" and "second" are merely intended to distinguish between different items but not intended to indicate or imply relative importance or implicitly specify the number of the indicated technical features, specific order, or order of precedence. In the description of the embodiments of this application, unless otherwise expressly specified, "a plurality of" means two or more.

Reference to an "embodiment" herein means that a specific feature, structure or characteristic described with reference to this embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

In the description of embodiments of this application, the term "and/or" merely indicates a relationship between related items, and represents three possible relationships.

For example, "A and/or B" may represent the following three circumstances: A alone, both A and B, and B alone. In addition, the character "/" herein generally indicates an "or" relationship between the item preceding the character and the item following the character.

In the description of embodiments of this application, the term "a plurality of" means two or more (including two). Similarly, "a plurality of groups" means two or more groups (including two groups), and "a plurality of pieces" means two or more pieces (including two pieces).

In the description of embodiments of this application, a direction or a positional relationship indicated by the terms such as "center", "longitudinal", "transverse", "length", "width", "thickness", "up", "down", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of embodiments of this application, but not intended to indicate or imply that the indicated device or component is necessarily located in the specified direction or constructed or operated in the specified direction. Therefore, such terms are not to be understood as a limitation on embodiments of this application.

In the description of the embodiments of this application, unless otherwise expressly specified and defined, the technical terms such as "mounting", "concatenation", "connection", and "fixing" need to be understood in a broad sense, for example, understood as a fixed connection or a detachable connection or integrally formed; or understood as a mechanical connection or an electrical connection; understood as a direct connection, or an indirect connection implemented through an intermediary; or understood as internal communication between two components or interaction between two components. A person of ordinary skill in the art can understand the specific meanings of the terms in the embodiments of this application according to specific situations.

Currently, as can be seen from the market trend, the application of power batteries is increasingly extensive. Power batteries are not only used in energy storage power systems such as hydro, thermal, wind, and solar power stations, but also widely used in electric means of transport such as electric bicycles, electric motorcycles, and electric vehicles, and used in many other fields such as military equipment and aerospace. The market demand for power batteries keeps soaring with the increase of the application fields of the power batteries.

The applicant hereof has noticed that a housing and an electrode post of an existing battery is prone to many problems after being manufactured, for example, is prone to various defects such as scratches, dimples, stains-induced bumps, and surface wire drawing. In order to prevent batteries with severe defects on the housing and the electrode post from entering subsequent processes, and ensure the production quality and safety performance of the final batteries, there is a need to photograph the battery surface and recognize a shot image to detect whether the battery is defective.

Usually the image acquisition device needs to be arranged at an angle to a light source so that the image acquisition device can receive the reflected light for imaging. However, the angle itself makes the light unable to enter the image acquisition device due to a light scattering effect, thereby deteriorating the image quality. Especially, the defects such as tiny bumps or dimples are not conspicuous in the image.

In addition, some components such as a cell electrode post are small in size, and the light source of a detection system is unadjustable. Consequently, for surfaces of some small components, the recognition is impracticable or of a low precision, thereby seriously impairing the production quality and safety performance of the final products of batteries.

In order to alleviate the problem of insufficient accuracy of battery detection, the applicant hereof finds through research that an appropriate optical detection solution can be provided for the battery detection by optimizing the structural design of the detection device and improving the arrangement of the light source and the camera. In this way, the shot detection image is more recognizable, and a detection result of the battery is determined based on the defects exhibited by the detection image, thereby improving the precision and accuracy of the battery detection.

The battery cell disclosed in an embodiment of this application is applicable to, but not limited to, electrical devices such as a vehicle, watercraft, or aircraft. A power supply system of the electrical devices may be formed by the battery cell, battery, and the like disclosed in this application, so as to alleviate deterioration of an expansion force of the battery cell and automatically adjust the degree of deterioration, supplement an electrolytic solution, and improve the performance stability and longevity of the battery.

An embodiment of this application provides an electrical device powered by a battery. The electrical device may be, but without being limited to, a mobile phone, a tablet, a notebook computer, an electric toy, an electric tool, an electric power cart, an electric vehicle, a ship, a spacecraft, and the like. The electric toy may include stationary or mobile electric toys, such as a game console, an electric car toy, an electric ship toy, an electric airplane toy, and the like. The spacecraft may include an airplane, a rocket, a space shuttle, a spaceship, and the like.

For ease of description in the following embodiments, a vehicle 1000 is used as an example of the electrical device according to an embodiment of this application.

Referring to FIG. 1, FIG. 1 is a schematic structural diagram of a vehicle 1000 according to some embodiments of this application. The vehicle 1000 may be an oil-fueled vehicle, a natural gas vehicle, or a new energy vehicle. The new energy vehicle may be a battery electric vehicle, a hybrid electric vehicle, a range-extended electric vehicle, or the like. A battery 100 is disposed inside the vehicle 1000. The battery 100 may be disposed at the bottom, front, or rear of the vehicle 1000. The battery 100 may be configured to supply power to the vehicle 1000. For example, the battery 100 may serve as an operating power supply of the vehicle 1000. The vehicle 1000 may further include a controller 200 and a motor 300. The controller 200 is configured to control the battery 100 to supply power to the motor 300, for example, to meet electrical energy requirements in starting, navigating, or running the vehicle 1000.

In some embodiments of this application, the battery 100 serves not only as an operating power supply of the vehicle 1000, but may also serve as a drive power supply of the vehicle 1000 to provide a driving power supply for the vehicle 1000 in place of or partly in place of fuel oil or natural gas.

Figure 2:
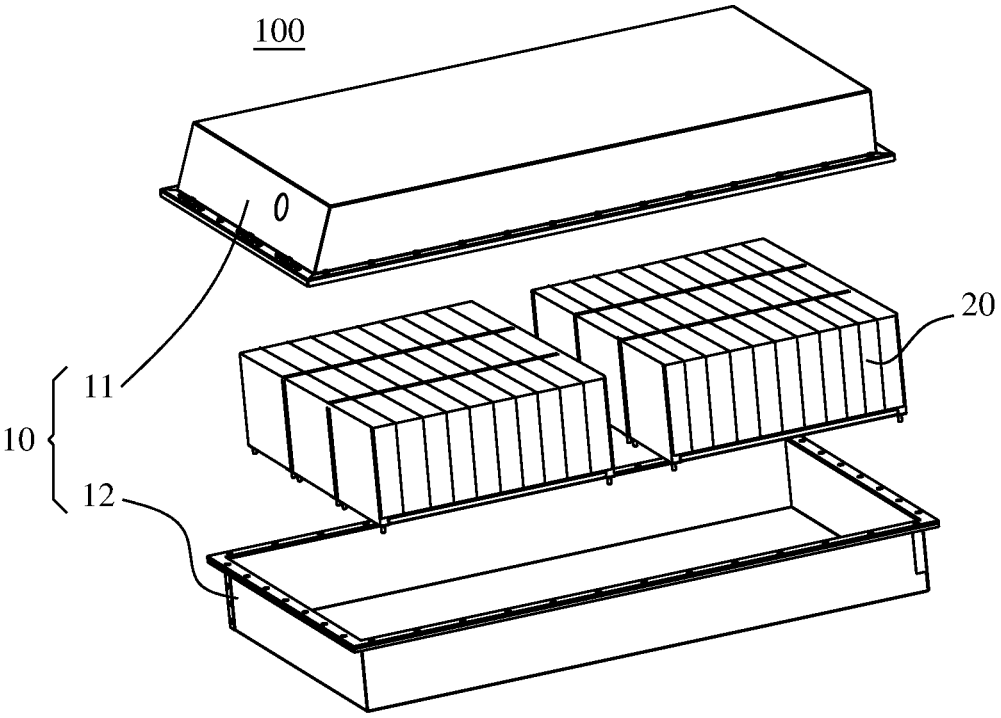
FIG. 2 is a schematic structural exploded view of a battery according to some embodiments of this application.

Referring to FIG. 2, FIG. 2 is an exploded view of a battery 100 according to some embodiments of this application. The battery 100 includes a box 10 and a battery cell 20. The battery cell 20 is accommodated in the box 10. The box 10 is configured to provide an accommodation space for the battery cell 20. The box 10 may be in various structures.

In some embodiments, the box 10 may include a first part 11 and a second part 12. The first part 11 and the second part 12 fit and cover each other. The first part 11 and the second part 12 together define an accommodation space configured to accommodate the battery cell 20. The second part 12 may be a hollow structure opened at one end. The first part 11 may be a plate-like structure. The first part 11 fits on an opening side of the second part 12 so that the first part 11 and the second part 12 together define the accommodation space. Alternatively, both the first part 11 and the second part 12 may be hollow structures opened at one side. The opening side of the first part 11 fits the opening side of the second part 12. Definitely, the box 10 formed by the first part 11 and the second part 12 may be in various shapes, such as a cylinder or a cuboid.

The battery 100 may contain a plurality of battery cells 20. The plurality of battery cells may be connected in series, parallel, or series-and-parallel pattern. The series-and-parallel pattern means a combination of series connection and parallel connection of the plurality of battery cells 20. The plurality of battery cells 20 may be directly connected in series, parallel, or series-and-parallel pattern, and then the whole of the plurality of battery cells 20 may be accommodated in the box 10. Alternatively, the plurality of battery cells 20 may be connected in series, parallel, or series-and-parallel pattern to form a battery 100 in the form of battery modules first. A plurality of battery modules are then connected in series, parallel, or series-and-parallel pattern to form a whole for being accommodated in the box 10. The battery 100 may further include other structures. For example, the battery 100 may further include a busbar component. The busbar component is configured to implement electrical connection between the plurality of battery cells 20.

Each battery cell 20 may be, but without being limited to, a secondary battery or primary battery; or may be a lithium-sulfur battery, a sodium-ion battery, or a magnesium-ion battery. The battery cell 20 may be in the shape of a cylinder, flat body, cuboid, or the like.

Figure 3:
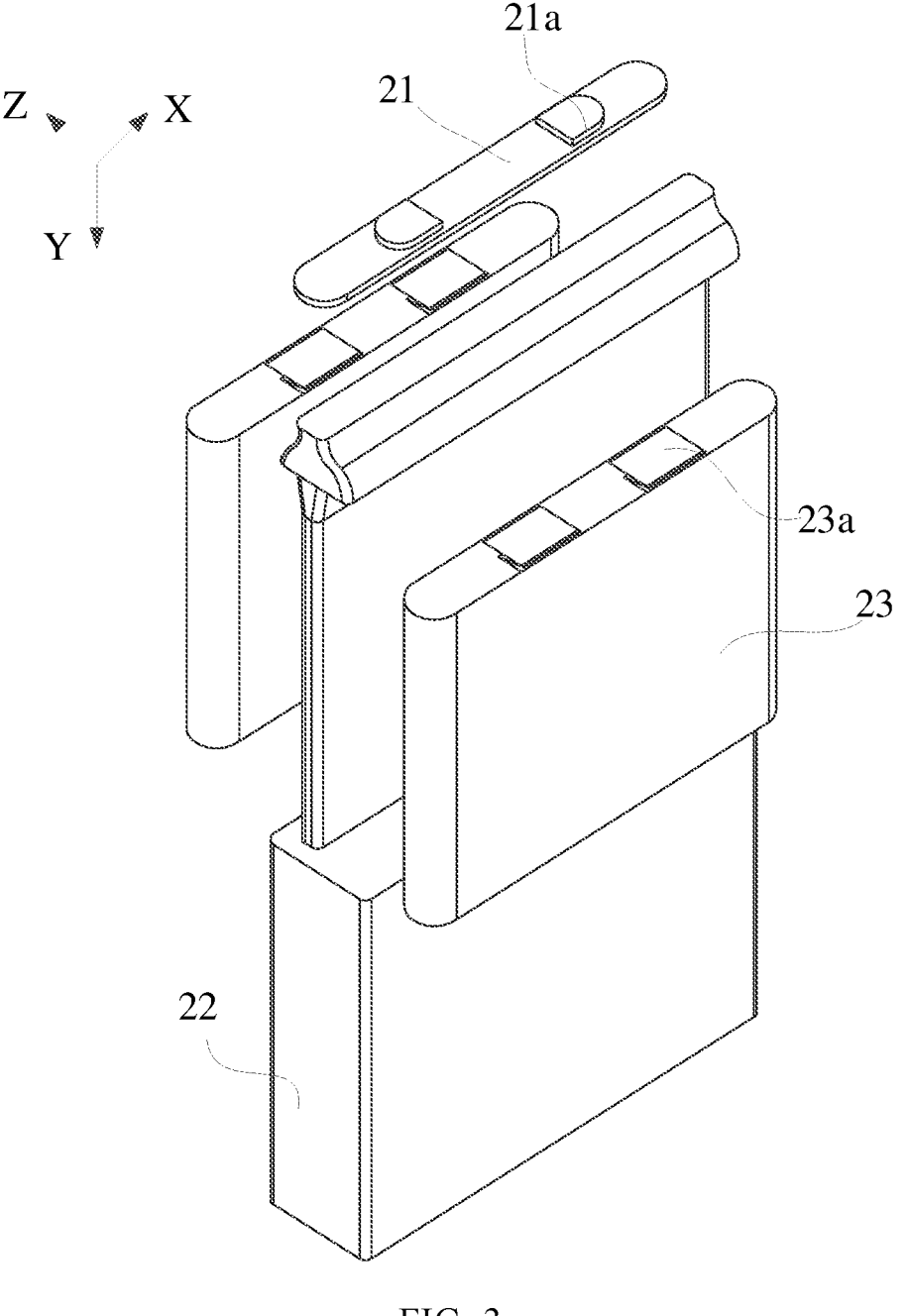
FIG. 3 is a schematic structural exploded view of a battery cell according to some embodiments of this application.

Referring to FIG. 3, FIG. 3 is a schematic structural exploded view of a battery cell 20 according to some embodiments of this application. The battery cell 20 is a minimum unit for making up a battery. As shown in FIG. 3, the battery cell 20 includes a cover plate 21, a housing 22, an electrode assembly 23, and other functional components.

The cover plate 21 is a component that covers and fits on the opening of the housing 22 to isolate the internal environment of the battery cell 20 from the external environment. Without limitation, the shape of the cover plate 21 may be adapted to the shape of the housing 22 to fit the housing 22. In some embodiments, the cover plate 21 may be made of a material of appropriate hardness and strength (such as aluminum alloy), thereby making the cover plate 21 not prone to deform in a case of being pressed or impacted, and improving the structural strength and safety performance of the battery cell 20. Functional components such as a cell electrode post 21a may be disposed on the cover plate 21. The cell electrode post 21a may be configured to be electrically connected to the electrode assembly 23 to output or input electrical energy of the battery cell 20. In some embodiments, the cover plate 21 may be equipped with a pressure relief mechanism configured to release an internal pressure when the internal pressure or temperature of the battery cell 20 reaches a threshold. The cover plate 21 may also be made of a variety of materials such as copper, iron, aluminum, stainless steel, aluminum alloy, or plastic, without being particularly limited herein. In some embodiments, an insulator may be further disposed on an inner side of the cover plate 21. The insulator may be configured to isolate an electrically connected component in the housing 22 from the cover plate 21 to reduce short-circuit risks. For example, the insulator may be plastic, rubber, or the like.

The housing 22 is a component configured to fit the cover plate 21 to form an internal environment of the battery cell 20. The formed internal environment may be used to accommodate the electrode assembly 23, the electrolytic solution, and other components. The housing 22 and the cover plate 21 may be stand-alone components. An opening may be made on the housing 22. At the opening, the cover plate 21 fits the opening to form the internal environment of the battery cell 20. Without limitation, the cover plate 21 and the housing 22 may be formed in one piece instead. Specifically, the cover plate 21 and the housing 22 may form a common connection face before other components are put into the housing. Subsequently, when the interior of the housing 22 needs to be sealed, the cover plate 21 is made to fit the housing 22. The housing 22 may be in various shapes and sizes, such as a cuboid, cylinder, or hexagonal prism. Specifically, the shape of the housing 22 may be determined depending on the specific shape and size of the electrode assembly 23. The housing 22 may be made of a variety of materials such as copper, iron, aluminum, stainless steel, aluminum alloy, or plastic, without being particularly limited herein.

The electrode assembly 23 is a component that incurs electrochemical reactions in the battery cell 100. The housing 22 may contain one or more electrode assemblies 23. The electrode assembly 23 is primarily formed by winding or stacking a positive electrode plate and a negative electrode plate. A separator is generally disposed between the positive electrode plate and the negative electrode plate. The parts, coated with an active material, of the positive electrode plate and the negative electrode plate, constitute a body portion of the electrode assembly. The part, coated with no active material, of the positive electrode plate and the negative electrode plate separately, constitutes a tab 23a. The positive tab and the negative tab may be located at one end of the body portion together or at two ends of the body portion respectively. In a charge-and-discharge process of the battery, the positive active material and the negative active material react with an electrolytic solution. The tabs 23a are connected to the electrode post to form a current circuit.

Figure 4:
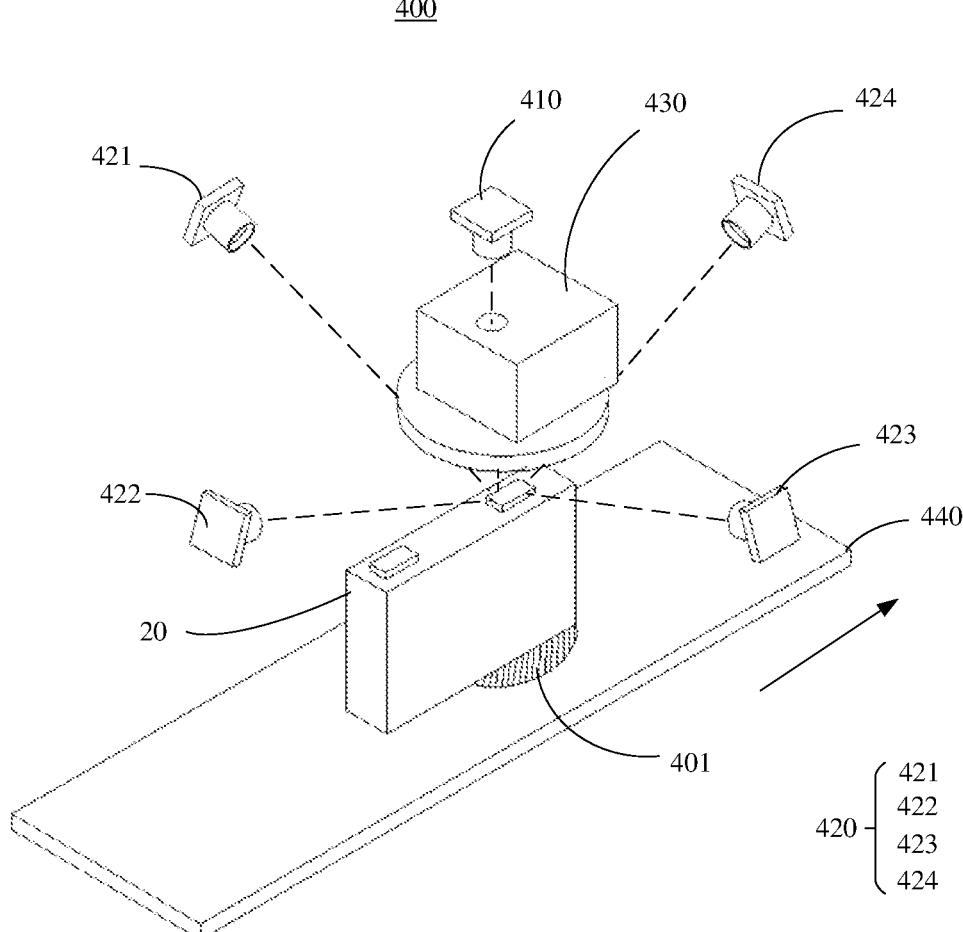
FIG. 4 is a schematic structural diagram of an optical detection device according to some embodiments of this application.
Figure 5:
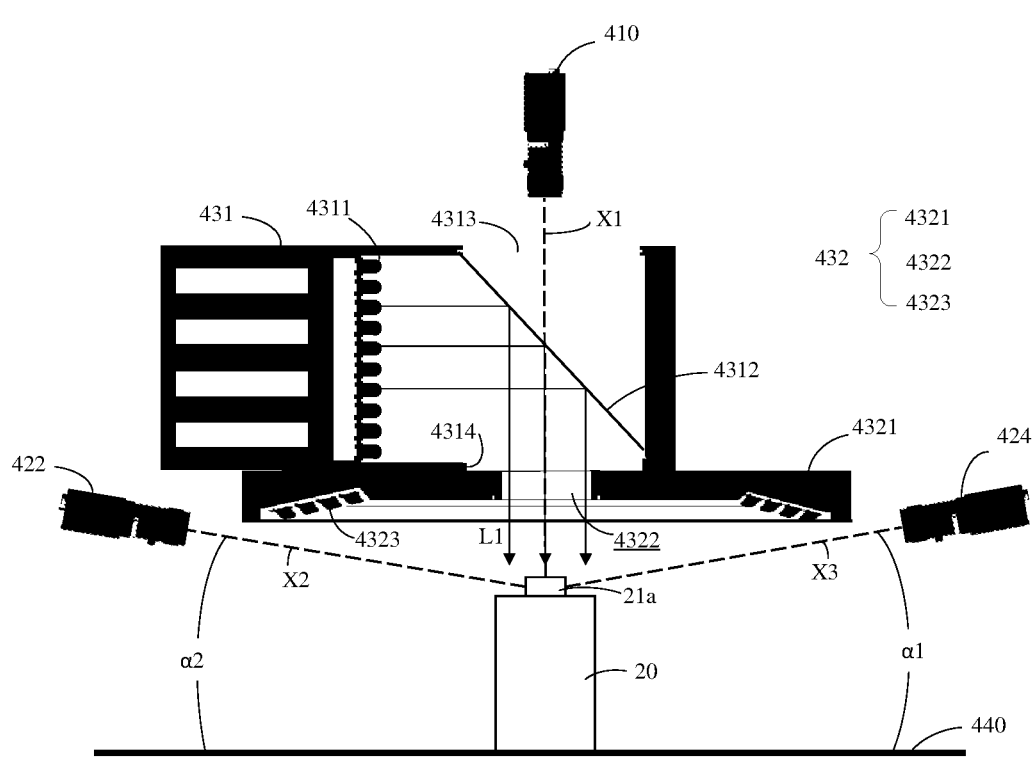
FIG. 5 is a cross-sectional schematic view of an optical detection device according to some embodiments of this application.

FIG. 4 is a schematic structural diagram of an optical detection device according to some embodiments of this application, and FIG. 5 is a cross-sectional schematic view of an optical detection device according to some embodiments of this application.

An embodiment in a first aspect of this application provides an optical detection device. As shown in FIG. 4 to FIG. 5, the optical detection device includes a detection workspace 401, a first image acquisition device 410, a second image acquisition device 420, a detection light source 430, and a conveyor 440. The detection workspace 401 is configured to hold a target workpiece under detection. The first image acquisition device 410 is configured to acquire an image of the target workpiece along a first direction. The second image acquisition device 420 is configured to acquire an image of the target workpiece along a second direction. The detection light source 430 is configured to provide detection light for the first image acquisition device 410 and the second image acquisition device 420. An optical axis of at least a part of the detection light L1 provided by the detection light source 430 is coaxial with an optical axis of the first image acquisition device 410. The optical axis of the first image acquisition device 410 is a first optical axis X1.

The detection light source 430 is a light source configured to emit detection light to assist the first image acquisition device 410 and the second image acquisition device 420 in imaging, and improve the imaging quality of the obtained image. The detection light may be white light.

The inspection workspace 401 is a space allocated for holding the target workpiece under detection, and is configured based on an imaging distance and a field-of-view of the image acquisition device. In an example, the detection workspace 401 may be a stand-alone workspace anvil for holding the target workpiece. In another example, the detection workspace 401 may be a specified region or a specified position that meets the shooting requirements of each image acquisition device, rather than a physical structure. When the target workpiece is moved to the detection workspace 401, the target workpiece can be photographed to obtain an image that meets requirements.

The conveyor 440 is configured to convey the target workpiece into or out of the detection workspace 401. The conveyor 440 may be various transport equipment such as a conveyor belt. The detection workspace 401 may be located on the conveyor 440. For example, a preset region on the conveyor belt is used as the detection workspace 401. The target workpiece is placed on the conveyor belt, and conveyed by the conveyor belt into and out of the region in which the detection workspace 401 is located. The first direction is different from the second direction. In this way, the first image acquisition device 410 and the second image acquisition device 420 can acquire images of different surfaces of the target workpiece separately. The first image acquisition device 410 and the second image acquisition device 420 may be any type of camera, such as a CCD line scan camera, a CCD area array camera, or the like. Understandably, the first direction is actually a direction of the optical axis of the first image acquisition device 410.

The target workpiece may be various objects under detection. The surface to be detected on the target workpiece may be one surface, or may be a plurality of different surfaces. In an example, the target workpiece may be a battery cell 20. The battery cell 20 may be an example of the battery cell 20 with a prismatic housing as described in the above embodiment. A plurality of surfaces such as a top surface and a lateral surface of the battery can be detected through the first image acquisition device 410 and the second image acquisition device 420. In another example, the target workpiece may be a component of the battery, such as a cell electrode post 21a. The cell electrode post 21a may be the cell electrode post 21a described in the above embodiment. A plurality of surfaces of the cell electrode post 21a, such as the top surface of the cell electrode post 21a and the lateral surface of the cell electrode post 21a, can be detected through the first image acquisition device 410 and the second image acquisition device 420.

The detection light emitted by the detection light source 430 is incident on a surface of the target workpiece under detection, reflected by the surface, and received by the first image acquisition device 410 and the second image acquisition device 420 to perform imaging.

In an example, the battery cell 20 is placed on the conveyor 440 and conveyed at a preset speed. When the cell electrode post 21a of the battery cell 20 arrives the detection workspace 401, the first image acquisition device 410 and the second image acquisition device 420 acquire the images of the cell electrode post 21a along different directions separately. The images may be shot in a flying shot mode. To be specific, the conveyor 440 may keep the original conveyance speed during shooting without deceleration or shutdown, thereby reducing the time spent on the detection, avoiding frequent startup and shutdown of the conveyor 440, and improving the lifespan of the conveyor 440.

Based on characteristics of coaxial light, a flat and even surface can reflect the light into a lens sufficiently, but a bumpy surface reflects the light obliquely to other places. Therefore, when a bumpy defect exists on the surface of the target workpiece, the corresponding shot image is obviously dimmer, and the bumpy places can be well highlighted, thereby avoiding a poor effect of feature visualization caused by an insufficient luminous flux.

In this embodiment, by providing a light source coaxial with the optical axis of the image acquisition device, the defects on the surface of the target workpiece under detection can be recognized more accurately through the image, thereby improving the accuracy of optical detection. In addition, due to a good imaging effect and high accuracy of the detection performed with the coaxial light source, the detection time spent by the target workpiece in staying in the detection workspace is greatly reduced. By means of the automatically running conveyor 440, by controlling the conveyance speed, the on- and off-state of the light source switch, and the shooting time of the image acquisition device through coordination, the optical detection device can implement a flying shot of the target workpiece in motion, thereby maximally keeping abreast of the production progress and increasing productivity. The images of different surfaces of the target workpiece can be acquired by the image acquisition devices arranged in different directions, thereby facilitating comprehensive detection of the quality of a plurality of surfaces of the target workpiece and improving the detection efficiency.

In some embodiments, the detection light source 430 includes a first sub-light source 431 and a second sub-light source 432. The first sub-light source 431 is configured to provide the detection light L1 coaxial with the first optical axis X1 of the first image acquisition device 410. The second sub-light source 432 is configured to provide the detection light incident on a lateral surface of the target workpiece.

The first sub-light source 431 and the second sub-light source 432 may be two independent light sources. The first sub-light source 431 is a coaxial light source, and can emit light coaxial with the optical axis of the first image acquisition device 410, so as to coordinate with the first image acquisition device 410 in image acquisition. As shown in FIG. 5, the light emitted by the light-emitting element 4311 in the first sub-light source 431 is reflected by a transflective beamsplitter 4312 and then incident on the target workpiece, such as a surface of the cell electrode post 21a. After being reflected by the surface, the light enters the first image acquisition device 410 to perform imaging.

The cell electrode post 21a includes a top surface and a lateral surface perpendicular to each other. As shown in FIG. 5, the top surface is an uppermost surface of the cell electrode post 21a. The lateral surface of the cell electrode post 21a is a lateral surface perpendicular to the top surface.

In some examples, the optical axis of the detection light emitted by the first sub-light source 431 may be perpendicular to the top surface of the cell electrode post 21a. The first image acquisition device 410 acquires a top image of the top surface of the cell electrode post 21a, and the second image acquisition device 420 acquires a lateral image of the lateral surface of the cell electrode post 21a. The coaxial light emitted by the first sub-light source 431 can improve the imaging effect of the top image, but the field-of-view is relatively small. The lateral surface of the cell electrode post 21a is perpendicular to the top surface, and therefore, is parallel to the optical axis of the light emitted by the first sub-light source 431. Therefore, the amount of light emitted by the first sub-light source 431 and reflectible by the lateral surface is very tiny, thereby greatly impairing the quality of the lateral image shot by the second image acquisition device 420.

The detection light emitted by the second sub-light source 432 and incident on the lateral surface of the target workpiece can supplement the light for the second image acquisition device 420, thereby improving the imaging quality of the second image acquisition device 420, and in turn, increasing accuracy of recognizing surface defects of the target workpiece.

In some embodiments, the first sub-light source 431 includes a light output port 4314. The second sub-light source 432 is located on a side of the first sub-light source 431, the side containing the light output port 4314. The second sub-light source 432 contains a transmissive hole 4322. The transmissive hole 4322 is made corresponding to the light output port 4314 of the first sub-light source 431 to allow passage of the detection light emitted by the first sub-light source 431.

The light emitted by the first sub-light source 431 is incident on the target workpiece through the light output port 4314. The side containing the light output port 4314 is a side of the first sub-light source 431, the side being close to the target workpiece. As shown in FIG. 5, the second sub-light source 432 is disposed on a side close to the target workpiece below the first sub-light source 431. The detection light emitted by the first sub-light source 431 passes through the light output port 4314, and then penetrates the transmissive hole 4322, and finally strikes the target workpiece.

Such a structural form can implement integration of the first sub-light source 431 and the second sub-light source 432, so that the structure is more concise and compact, occupies a smaller space, and can reduce the workload in subsequent installation and debugging.

In some embodiments, the second sub-light source 432 includes an end cap 4321 and a light-emitting element 4323. The end cap 4321 is fixedly connected to the side of the first sub-light source 431, the side containing the light output port 4314. A transmissive hole 4322 is made on the end cap 4321. The light-emitting element 4323 is fixed onto a lateral surface of the end cap 4321, the lateral surface being away from the first sub-light source 431. The light-emitting element 4323 is located on a periphery of the transmissive hole 4322.

The light-emitting element 4323 may be a light-emitting diode or another type of light-emitting sources. The transmissive hole 4322 may be a through-hole, or a hole-shaped region formed of a transparent material and transmissive to only light.

The light-emitting element 4323 of the second sub-light source 432 is directly fixedly connected to the first sub-light source 431 by the end cap 4321, thereby making the structural form of the detection light source 430 more compact, shortening the distance between the light-emitting elements in the two sub-light sources, and facilitating the wiring arrangement of the detection light source 430.

Figure 6:
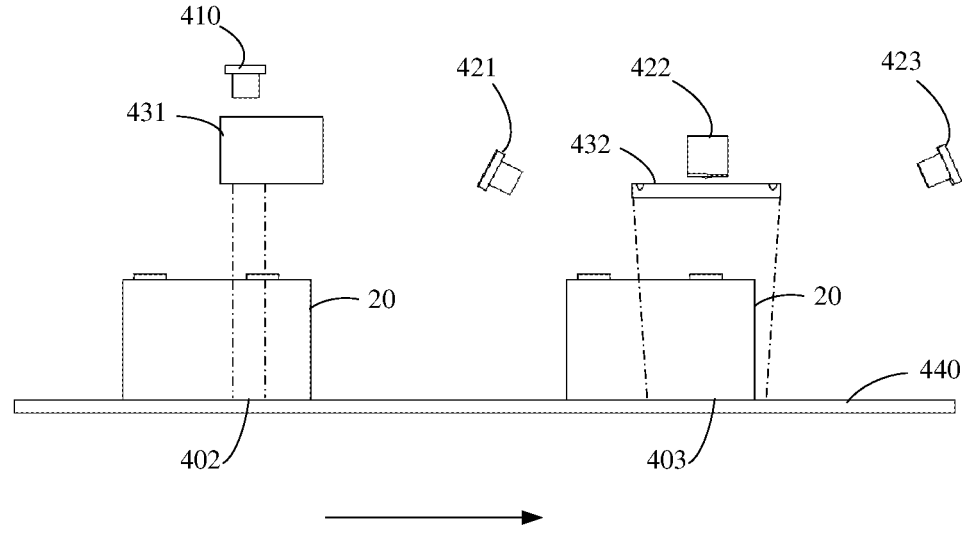
FIG. 6 is a schematic structural diagram of an optical detection device according to some other embodiments of this application.

FIG. 6 is a schematic structural diagram of an optical detection device according to some other embodiments of this application. In some embodiments, as shown in FIG. 6, the detection workspace 401 may include a first detection workspace 402 and a second detection workspace 403 arranged at intervals. The first image acquisition device 410 and the first sub-light source 431 are located above the first detection workspace 402 to acquire the image of the target workpiece in the first detection workspace 402. The second image acquisition device 420 and the second sub-light source 432 are disposed around the second detection workspace 403 to acquire the image of the target workpiece in the second detection workspace 403.

The first image acquisition device 410 and the first sub-light source 431 are located in the first detection workspace 402, so as to acquire a top image of the target workpiece (such as the cell electrode post 21a). The second image acquisition device 420 and the second sub-light source 432 are disposed around the second detection workspace 403, so as to acquire lateral images of the target workpiece (such as the cell electrode post 21a) after the target workpiece moves from the first detection workspace 402 into the second detection workspace 403.

In an example, the conveyor 440 may pass the battery cell 20 through the first detection workspace 402 and the second detection specimen holder 403 successively. In this way, the first image acquisition device 410 acquires an image (such as a top image) of the cell electrode post 21a along a first direction at the first detection workspace 402, and then the second image acquisition device 420 acquires another image (such as a lateral image) of the cell electrode post 21a along a second direction at the second detection workspace 403.

In an example, the first sub-light source 431 and the second sub-light source 432 remain integrated in structure. By adjusting the position and angle of the image acquisition device and the light source, the first image acquisition device 410 is enabled to shoot an image of the target workpiece located in the first detection workspace 402, and the second image acquisition device 420 is enabled to shoot an image of the target workpiece in the second detection workspace 403.

By disposing two detection workspaces to acquire the images of the target workpiece in two different directions (such as a top image and a lateral image), the first image acquisition device 410 and the second image acquisition device 420 can be controlled independently to shoot images in the two directions. The light striking logic of the corresponding light source is controlled based on different image acquisition devices, so as to provide more pertinent detection light and prevent the imaging effect from being impaired by mutual interference between the light sources. In addition, even in a case of a flying shot, the two image acquisition devices shoot images separately and independently. Therefore, in some embodiments, a shooting action for a single detection workspace can be divided into two successive shooting actions completed in a shorter time, thereby not only ensuring desirable imaging quality, but also further reducing the time spent by the target workpiece in staying in one detection workspace to meet the need of shooting. In this way, the conveyor can convey the workpiece faster to enable the flying shot, thereby shortening the time spent on detection, and improving productivity. In some embodiments, the optical detection device 400 includes a plurality of second image acquisition devices 420. The plurality of the second image acquisition devices 420 are disposed at intervals around the detection workspace 401.

The field-of-view of a single camera is limited. For a target workpiece that needs to be detected within a 360° range of the entire lateral surface, a single camera is unable to cover the entire lateral surface. In this case, a plurality of second image acquisition devices 420 may be disposed. The plurality of second image acquisition devices 420 are arranged at intervals around the detection workspace 401. In this way, each second image acquisition device 420 acquires a lateral image within a specified field-of-view. The images acquired by the plurality of second image acquisition devices 420 are spliced together to obtain a lateral image of the entire 360° lateral range of the target workpiece.

A plurality of second image acquisition devices 420 may be arranged at uniform intervals. As shown in FIG. 4, there are 4 second image acquisition devices, evenly arranged as a first camera 421, a second camera 422, a third camera 423, and a fourth camera 424 around the detection workspace 401 in four different directions respectively. Projections of two adjacent cameras on a plane in which the detection workspace 401 are at an angle of 90° to the detection workspace 401. In this way, the entire lateral surface of the target workpiece can be detected as long as an imaging field-of-view of any one of the first camera 421, the second camera 422, the third camera 423, or the fourth camera 424 is larger than 90°.

The plurality of second image acquisition devices 420 that shoot images separately can implement full-range detection on the lateral surface of the target workpiece, so that the defects of the target workpiece can be determined more comprehensively and more accurately, and the accuracy of detection is improved.

Figure 7:
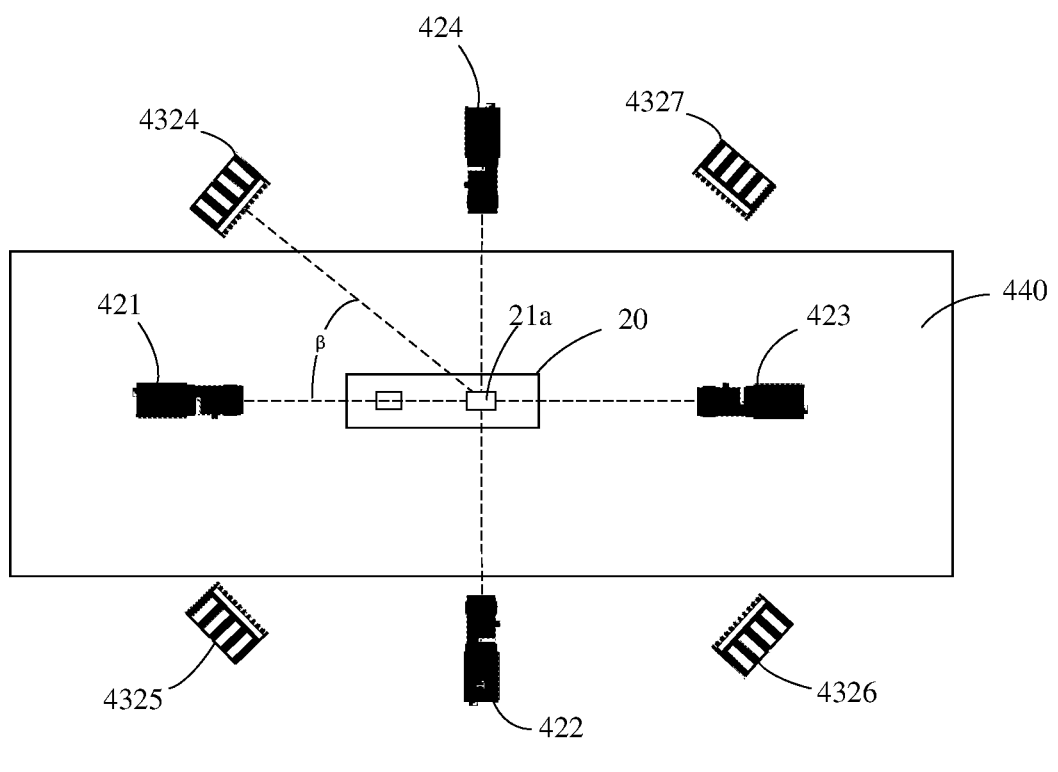
FIG. 7 is a schematic structural diagram of a second sub-light source according to some embodiments of this application.
Figure 8:
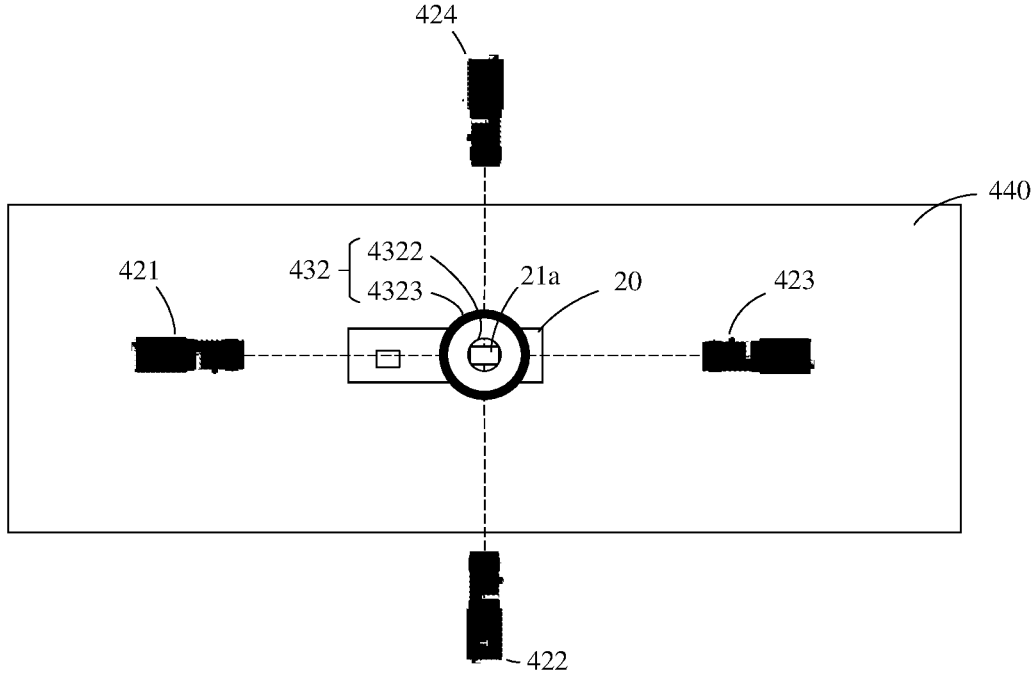
FIG. 8 is a schematic structural diagram of a second sub-light source according to some other embodiments of this application.

FIG. 7 is a schematic structural diagram of a second sub-light source 432 according to some embodiments of this application, and FIG. 8 is a schematic structural diagram of a second sub-light source 432 according to some other embodiments of this application.

In some embodiments, the second sub-light source 432 includes a plurality of bar-shaped light sources that are in one-to-one correspondence with the second image acquisition devices 420 and arranged at intervals.

In some examples, the number of the second sub-light sources 432 may be identical to that of the second image acquisition devices 420. As shown in FIG. 7, the second sub-light sources 432 may be four bar-shaped light sources: a first bar-shaped light source 4324, a second bar-shaped light source 4325, a third bar-shaped light source 4326, and a fourth bar-shaped light source 4327. The four bar-shaped light sources may provide detection light for the first camera 421, the second camera 422, the third camera 423, and the fourth camera 424 respectively. The bar-shaped light sources may be arranged at an angle of 45° to the corresponding camera, so that the detection light emitted from the bar-shaped light source enters the camera after being reflected by the lateral surface of the cell electrode post 21a, so as to form images of higher quality.

By arranging a plurality of bar-shaped light sources in coordination with a plurality of second image acquisition devices 420, it is ensured that each second image acquisition device 420 can photograph the desired detection light, thereby ensuring the imaging quality of each second image acquisition device 420.

In some embodiments, the second sub-light source 432 is a ring-shaped light source. A diameter of the ring-shaped light source is larger than a preset diameter.

As shown in FIG. 8, the second sub-light source 432 is a ring-shaped light source. That is, the light-emitting element 4323 of the second sub-light source 432 is circular. The diameter of the ring-shaped light source means a diameter of the light-emitting element 4323, and specifically, may be an inside diameter of the ring-shaped light-emitting element 4323. The specific diameter of the ring-shaped light source may be set depending on the dimensions of the detection object, the detection position, the detection workspace, and other factors, so that the detection light emitted by the light source can be incident on the lateral surface of the target workpiece. In some examples, the preset diameter may be greater than a maximum length of the projection of the target workpiece on the surface in which the detection workspace is located, so as to ensure that the ring-shaped light source is disposed on the periphery of the target workpiece under detection.

The second sub-light source 432 arranged as a ring-shaped light source can implement 360° irradiation on the lateral surface of the target workpiece, so as to coordinate with the second image acquisition device to shoot the image of the entire lateral side for detection and analysis, and improve the quality of the detection image. The arrangement of the ring-shaped light source is simpler than the arrangement of a plurality of independent light sources, and saves the time for subsequent mounting and debugging.

In an example, as shown in FIG. 4, the second sub-light source 432 is a ring-shaped light source and is fixedly connected to the first sub-light source 431. The two sub-light sources are integrated into a whole detection light source 430, thereby further simplifying the structure of the light source and improving the degree of integration. In another example, the second sub-light source 432 is a ring-shaped light source independent of the first sub-light source 431, and is arranged along a circumference of the detection workspace.

In this embodiment, by making the second sub-light source 432 be a ring-shaped light source to provide the detection light to the lateral surface of the target workpiece, the man-hours for mounting and debugging of the light source are reduced and the detection efficiency is improved on the basis of ensuring desirable quality of the lateral image.

In some embodiments, the optical axis of the first image acquisition device 410 is perpendicular to a plane in which the detection workspace 401 is located.

The first image acquisition device 410 may be disposed directly above the detection workspace 401. The first optical axis X1 of the first image acquisition device 410 is made to be perpendicular to the plane in which the detection workspace 401 is located. The first sub-light source 431 may be disposed between the first image acquisition device 410 and the detection workspace 401. A light output port 4314 is provided on a side of the first sub-light source 431, the side being close to the detection workspace 401. A reflective port 4313 is provided on a side close to the first image acquisition device 410. The light output port 4314 and the reflective port 4313 are disposed opposite to each other along an optical axis direction of the first image acquisition device 410, that is, the first direction, so as to enable the light emitted by the first sub-light source 431 along the first direction to return into the first image acquisition device 410 after being reflected.

The top surface of the workpiece is usually a flat and even surface parallel to the plane in which the detection workspace 401 is located. Therefore, when the first optical axis X1 of the first image acquisition device 410 is made to be perpendicular to the plane in which the detection workpiece 401 is located, it means that the first optical axis X1 of the first image acquisition device 410 is perpendicular to the top surface of the target workpiece. In this way, the light from the top surface can enter the first image acquisition device 410 as much as practicable after being reflected, thereby avoiding a poor feature visualization effect caused by an insufficient luminous flux, improving the image quality, reflecting various subtle defects of the top surface more clearly, and in turn, improving the accuracy of detection.

In some embodiments, a mounting angle between the optical axis of the second image acquisition device 420 and a plane in which the detection workspace 401 is located is adjustable. The mounting angle is greater than or equal to 10° and less than or equal to 45°.

The mounting angle, formed between the optical axis of the second image acquisition device 420 and the plane in which the detection workspace 401 is located, is an angle between the mounting angle of the second image acquisition device 420 and the plane in which the detection workspace 401 is located. Understandably, the mounting angles of a plurality of second image acquisition devices may be the same or different, and may be specifically set depending on the imaging requirements in each case. As shown in FIG. 5, the angles, formed of the second optical axis X2 of the second camera 422 and the third optical axis X3 of the fourth camera 424 to the plane in which the detection workspace 401 is located, are a second mounting angle α2 and a first mounting angle α1, respectively. Adjustability of the second mounting angle α2 and the first mounting angle α1 means that the second optical axis X2 of the second camera 422 and the third optical axis X3 of the fourth camera 424 can be adjusted relative to the detection workspace 401 depending on specific detection needs. Controlling the first mounting angle α1 and the second mounting angle α2 to fall between 10° and 45° can implement flexible adjustment of the angle on the basis of ensuring relatively high light intensity of imaging. Therefore, the field-of-view can vary with the object under detection, and a desirable imaging effect can be achieved by performing adjustment based on the defect characteristics.

In some examples, the adjustability of the mounting angle of the second image acquisition device 420 also means that the mounting angle is adaptable to the adjusted detection workspace. For example, in a case that a first detection workspace 402 and a second detection workspace 403 are disposed at intervals, the field-of-view of the second image acquisition device can be adjusted toward the corresponding detection workspace directly by adjusting the mounting angle of the second image acquisition device 420, without a need of re-mounting or rearrangement.

In some embodiments, the optical detection device further includes a 3D camera. The 3D camera is configured to acquire a 3D image of the target workpiece.

The 3D camera may perform image acquisition independently of the first image acquisition device 410 and the second image acquisition device 420. In other words, the 3D camera may acquire an image at the detection workspace 401, or acquire a 3D image from other locations. In an example, the 3D camera acquires a 3D image at the detection workspace 401, so that the quality of the image can be improved by using the detection light emitted by the detection light source.

The 3D camera acquires a 3D image of the target workpiece, such as the 3D image of the cell electrode post 21a. The 3D image includes three-dimensional features of the cell electrode post 21a, thereby enriching the feature information of the images acquired by the first image acquisition device 410 and the second image acquisition device 420. During recognition of the defects in the image, a defect may be recognized by using the 3D image in combination with the images acquired by the first image acquisition device 410 and the second image acquisition device 420, so as to obtain more accurate defect parameters and more accurately determine the impact caused by the defects of the cell electrode post 21a to the quality of the battery.

Figure 9:
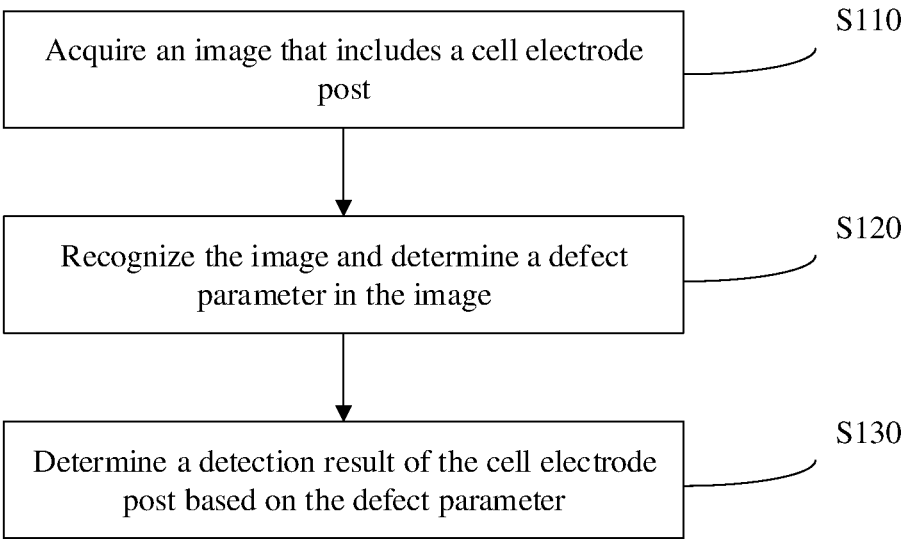
FIG. 9 is a flowchart of a cell electrode post detection method according to some embodiments of this application.

FIG. 9 is a flowchart of a cell electrode post detection method according to some embodiments of this application. As shown in FIG. 4, FIG. 5, and FIG. 9, an embodiment in a second aspect of this application further provides a cell electrode post detection method. The method includes the following steps:

Step S110: Acquire an image of a cell electrode post.

The image of the cell electrode post 21a may be acquired by using the optical detection device 400 in the above embodiment. The acquired image may include a top image of the top surface of the cell electrode post 21a and a lateral image of the lateral surface of the cell electrode post 21a. Understandably, a plurality of second image acquisition devices may acquire lateral images of a plurality of different parts.

Step S120: Recognize the image and determine a defect parameter in the image.

The image is automatically recognized by a computerized visual inspection algorithm to determine the defect parameters corresponding to the defect parts of the top image and the lateral image respectively. The defects of the cell electrode post may be one or more of: scratches on the surface of the cell electrode post, bumps, stains (such as electrolyte residue), wire drawing of the metal on the surface of the electrode post, or the like.

Step S130: Determine a detection result of the cell electrode post based on the defect parameter.

Determine the defect parameters of the corresponding defects based on the image recognition. Determine, based on the defect parameters, the impact caused by the defect onto the quality of the battery, and output a corresponding detection result. Specifically, a detection result may be classed as pass and defect depending on the impact caused by the defect parameters onto the quality of the battery.

In some embodiments, step S120 includes the following substeps:

(i) Locate the cell electrode post in the image.

During image recognition, the location of the cell electrode post in the image is determined first by recognizing image features of the cell electrode post to preclude interference caused by the objects other than the image of the cell electrode post.

(ii) Sort out pixels of a defect region of the cell electrode post from the image to obtain a defect image.

Further, the defect features in the image of the cell electrode post are recognized to determine the defect region. The defect region may be determined with reference to a gray value of the image pixels. The pixels of the defect region are sorted out to obtain the defect image.

(iii) Determine the defect parameter based on the defect image, where the defect parameter includes at least one of a defect type, a defect size, or a defect gray value.

Further recognize the defect image, and determine and extract relevant features of the defect image as defect parameters, for example, recognize the defect type by using a preset sorting algorithm, and determine the defect type of the defect image. Recognize and determine the size of the defect image such as at least one of length, width, or area of the defect image. Recognize the gray value of the pixels in the defect image to determine the severity of the defect.

By performing feature recognition on the image of the defect region of the cell electrode post, defect-related feature parameters can be obtained so that the defects can be determined accurately subsequently, thereby improving the accuracy of detecting the cell electrode post.

In some embodiments, step S130 includes: determining a detection result corresponding to the defect parameter and related to the cell electrode post based on a preset correspondence between the defect parameter and the detection result.

The correspondence between the defect parameter and the detection result may be preset. After the defect parameter is obtained, the corresponding detection result is determined based on the correspondence, so that an actuator can perform a corresponding operation subsequently based on the specific detection result. Based on the preset correspondence between the defect parameter and the detection result, the impact on the quality of the battery is determined based on the defect parameter obtained through image recognition. The criterion of determining is unified, thereby avoiding subjective misjudgment and improving the processing efficiency.

In some embodiments, the cell electrode post detection method further includes: performing the following operations after step S130:

excluding, in response to a detection result indicative of a defect, a battery cell that includes a defective cell electrode post; and outputting a detection result to an actuator such as a sorting mechanism, so that the sorting mechanism sorts the batteries based on the detection result, thereby preventing the defective batteries from entering subsequent processes.

Figure 10:
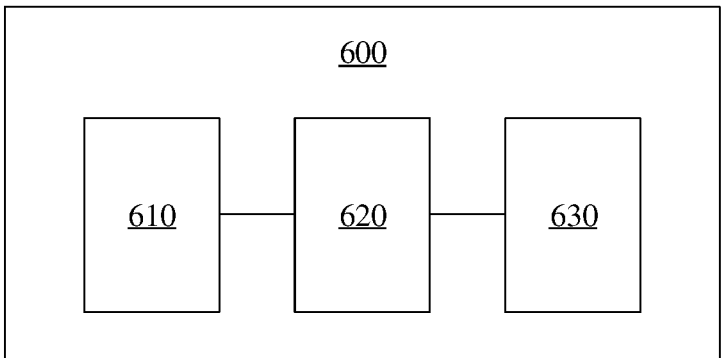
FIG. 10 is a structural block diagram of a cell electrode post detection device according to some embodiments of this application.

FIG. 10 is a structural block diagram of a cell electrode post detection device according to some embodiments of this application. As shown in FIG. 10, an embodiment in a third aspect of this application provides a cell electrode post detection device 600. The cell electrode post detection device includes an optical detection device 610, an image recognition module 620, and a determining module 630.

The optical detection device 610 is configured to acquire an image of a cell electrode post. The image recognition module 620 is configured to recognize the image of the cell electrode post acquired by the optical detection device. The determining module 630 is configured to determine a detection result of the cell electrode post based on a recognition result of the image recognition module.

The optical detection device 610 may be the optical detection device 400 according to any one of the above embodiments.

An embodiment in a fourth aspect of this application provides an electronic device. The electronic device includes: at least one processor; and a memory connected in communication with the at least one processor. The memory stores an instruction executable by the at least one processor. The instruction is executed by the at least one processor so that the at least one processor is enabled to perform the detection method according to any one of the foregoing embodiments.

An embodiment in a fifth aspect of this application provides a computer-readable storage medium on which a computer program is stored. When executed by a processor, the computer program implements the detection method according to any one of the foregoing embodiments.

The following describes an embodiment of this application in detail with reference to FIG. 4 to FIG. 5.

Referring to FIG. 4 and FIG. 5, the optical detection device 400 includes a detection workspace 401, a first image acquisition device 410, a second image acquisition device 420, a detection light source 430, and a conveyor 440. The detection workspace 401 is configured to hold a target workpiece under detection. The first image acquisition device 410 is disposed above the detection workspace 401. The second image acquisition device 420 includes a first camera 421, a second camera 422, a third camera 423, and a fourth camera 424 that are arranged around the detection workspace 401. The first camera 421, the second camera 422, the third camera 423, and the fourth camera 424 are located in four different directions relative to the detection workspace 401 respectively, so as to photograph the lateral surface of the target workpiece.

The detection light source 430 includes a first sub-light source 431 and a second sub-light source 432 integrated as a whole. The optical axis of the detection light L1 emitted by the first sub-light source 431 is coaxial with the optical axis X1 of the first image acquisition device 410, and is perpendicular to the surface in which the detection workspace 401 is located. The second sub-light source 420 is located on a side of the first sub-light source 431, the side containing a light output port 4314. The second sub-light source 420 is a ring-shaped light source. The diameter of the ring-shaped light source is larger than a maximum diameter of the detection workspace 401. In this way, the second sub-light source 420 can emit detection light to the lateral surface of the target workpiece along the 360° circumference of the target workpiece without blind angles to assist the first camera 421, the second camera 422, the third camera 423, and the fourth camera 424 in imaging. The first camera 421, the second camera 422, the third camera 423, the fourth camera 424, and the first image acquisition device 410 may be 2D line scan cameras or 2D area array cameras.

The object under detection is a cell electrode post 21a of a battery cell 20. The battery cell 20 is placed on a conveyor 440. The conveyor 440 conveys the cell electrode post 21a to the detection workspace 401 to enter the fields-of-view of the first image acquisition device 410 and the second image acquisition device 420. The first image acquisition device 410 and the second image acquisition device 420 shoot a top image of the top surface of the cell electrode post 21a and a lateral image of the lateral surface of the cell electrode post 21a respectively. The lateral image may be four lateral images shot by four cameras respectively, or may be one lateral image of the entire lateral surface obtained by splicing the four images.

The following specific shooting steps may be performed in a flying shot mode while the conveyor 440 keeps moving:

(i) Turn on the first sub-light source 431 to emit coaxial detection light, and shoot a top image by using the first image acquisition device 410; and (ii) Turn on the second sub-light source 432 to emit ring-shaped detection light, and shoot a lateral image by using the second image acquisition device 420.

To recognize the top image and the lateral image, determine the location of the cell electrode post in the image first by recognizing the image features of the cell electrode post, and then recognize the defect features in the image of the cell electrode post to determine a defect region. Sort out the pixels in the defect region to obtain a defect image. Further recognize the defect image to determine the defect parameter, where the defect parameter includes at least one of a defect type, a defect size, or a defect gray value. Finally, a corresponding detection result is output based on the defect parameter, and then an actuator performs sorting based on the detection result, thereby completing the entire detection process.

In some examples, during step (i) "turn on the first sub-light source 431 to emit coaxial detection light" in the above shooting steps, a low-exposure lateral image may be shot by the second image acquisition device 420. Subsequently, after the second sub-light source 432 is turned on in step (ii), a high-exposure lateral image is shot by the second image acquisition device 430.

The image recognition is performed by combining the low-exposure lateral image and the high-exposure lateral image, or the two images may be blended before subsequent image recognition. In this way, the accuracy of defect recognition is improved by using the image features under different exposures. Especially in a case of flying-shot detection, the foregoing technical solution can compensate for the disadvantage that the imaging quality of a moving object is relatively low.

Finally, it is hereby noted that the foregoing embodiments are merely intended to describe the technical solutions of this application but not to limit this application. Although this application has been described in detail with reference to the foregoing embodiments, a person of ordinary skill in the art understands that modifications may still be made to the technical solutions described in the foregoing embodiments, or equivalent replacements may still be made to some or all technical features in the technical solutions. Such modifications and equivalent replacements fall within the scope of the claims and specification hereof without making the essence of the corresponding technical solutions depart from the scope of the technical solutions of the embodiments of this application. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. An optical detection device, comprising:
a detection workspace, configured to hold a target workpiece under detection;
a first image acquisition device, configured to acquire an image of the target workpiece along a first direction;
a plurality of second image acquisition devices, configured to acquire an image of the target workpiece along directions different from the first direction;
a detection light source, configured to provide detection light for the first image acquisition device and the plurality of second image acquisition devices, and comprising a first sub-light source and a second sub-light source, the second sub-light source comprising a plurality of bar-shaped light sources and configured to provide the detection light incident on a lateral surface of the target workpiece; and
a conveyor, configured to convey the target workpiece into or out of the detection workspace;
wherein:
an optical axis of the detection light provided by the first sub-light source of the detection light source is coaxial with an optical axis of the first image acquisition device;
in a plane perpendicular to the first direction, projections of the plurality of second image acquisition devices and projections of the plurality of bar-shaped light sources are alternately arranged along a circle around a center of the detection workspace at a uniform interval; and
the second sub-light source is disposed below the first sub-light source;
the first sub-light source comprises a light output port, and the second sub-light source is located on a side, of the first sub-light source, having the light output port; and

the second sub-light source contains a transmissive hole, the transmissive hole is made corresponding to the light output port of the first sub-light source to allow passage of the detection light emitted by the first sub-light source, and an opening size of the light output port of the first sub-light source is larger than an opening size of the transmissive hole of the second sub-light source.

2. The optical detection device according to claim 1, wherein the first sub-light source is configured to provide the detection light coaxial with the optical axis of the first image acquisition device.

3. The optical detection device according to claim 1, wherein the second sub-light source comprises:
an end cap, fixedly connected to the side, of the first sub-light source, having the light output port, and the transmissive hole is made on the end cap; and
a light-emitting element, fixed on a lateral surface, of the end cap, away from the first sub-light source, wherein the light-emitting element is located on a periphery of the transmissive hole.

4. The optical detection device according to claim 2, wherein:
the detection workspace comprises a first detection workspace and a second detection workspace spaced apart from each other;
the first image acquisition device and the first sub-light source are located above the first detection workspace to acquire the image of the target workpiece in the first detection workspace; and
the plurality of second image acquisition devices and the second sub-light source are disposed around the second detection workspace to acquire the image of the target workpiece in the second detection workspace.

5. The optical detection device according to claim 1, wherein the optical axis of the first image acquisition device is perpendicular to a plane in which the detection workspace is located.

6. The optical detection device according to claim 1, wherein a mounting angle between an optical axis of one of the plurality of second image acquisition devices and a plane in which the detection workspace is located is adjustable, and the mounting angle is greater than or equal to 10° and less than or equal to 45°.

7. The optical detection device according to claim 1, further comprising:
A 3D camera, configured to acquire a 3D image of the target workpiece.

8. A cell electrode post detection method, comprising:
acquiring an image of a cell electrode post using the optical detection device according to claim 1;
recognizing the image and determining a defect parameter in the image; and
determining a detection result of the cell electrode post based on the defect parameter.

9. The cell electrode post detection method according to claim 8, wherein recognizing the image and determining the defect parameter in the image comprise:
locating the cell electrode post in the image;
sorting out pixels of a defect region of the cell electrode post from the image to obtain a defect image; and
determining the defect parameter based on the defect image, wherein the defect parameter comprises at least one of a defect type, a defect size, or a defect gray value.

10. The cell electrode post detection method according to claim 8, wherein determining the detection result of the cell electrode post based on the defect parameter comprises:

determining a detection result corresponding to the defect parameter and related to the cell electrode post based on a preset correspondence between the defect parameter and the detection result.

11. The cell electrode post detection method according to claim 8, further comprising:

excluding, in response to the detection result being indicative of a defect, a battery cell that comprises the cell electrode post.

12. An electronic device, comprising:

at least one processor; and a memory connected in communication with the at least one processor, wherein the memory stores an instruction executable by the at least one processor, and the instruction is executed by the at least one processor so that the at least one processor is enabled to perform the detection method according to claim 8.

13. A computer-readable storage medium, wherein a computer program is stored on the computer-readable storage medium, and, when executed by a processor, the computer program causes the processor to implement the detection method according to claim 8.

14. A cell electrode post detection device, comprising:

the optical detection device according to claim 1, configured to acquire an image of a cell electrode post;

an image recognition module, configured to recognize the image of the cell electrode post acquired by the optical detection device; and a determining module, configured to determine a detection result of the cell electrode post based on a recognition result of the image recognition module.

15. The optical detection device according to claim 1, wherein:

the first direction is perpendicular to a plane in which the detection workspace is located;

an angle between the optical axis of the first image acquisition device and an optical axis of the detection light provided by the second sub-light source is smaller than an angle between the optical axis of the first image acquisition device and an optical axis of one of the plurality of second image acquisition devices; and the first image acquisition device, the first sub-light source, the second sub-light source and the second image acquisition device are arranged in sequence from top to bottom in the first direction.

16. An optical detection device, comprising:

a detection workspace, configured to hold a target workpiece under detection;

a first image acquisition device, configured to acquire an image of the target workpiece along a first direction;

a plurality of second image acquisition devices disposed at intervals around the detection workspace, configured to acquire an image of the target workpiece along directions different from the first direction;

a detection light source, configured to provide detection light for the first image acquisition device and the second image acquisition device, and comprising a first sub-light source and a second sub-light source; and a conveyor, configured to convey the target workpiece into or out of the detection workspace;

wherein:

an optical axis of at least a part of the detection light provided by the first sub-light source of the detection light source is coaxial with an optical axis of the first image acquisition device;

a first mounting angle of one of the plurality of second image acquisition devices is formed between an optical axis of the one of the plurality of second image acquisition devices and a plane perpendicular to the first direction;

a second mounting angle of another one of the plurality of second image acquisition devices is formed between an optical axis of the another one of the plurality of second image acquisition devices and the plane perpendicular to the first direction;

the first mounting angle is different from the second mounting angle, and each of the first mounting angle and the second mounting angle is greater than or equal to 10° and less than or equal to 45°; and the second sub-light source is disposed below the first sub-light source;

the first sub-light source comprises a light output port, and the second sub-light source is located on a side, of the first sub-light source, having the light output port; and the second sub-light source contains a transmissive hole, the transmissive hole is made corresponding to the light output port of the first sub-light source to allow passage of the detection light emitted by the first sub-light source, and an opening size of the light output port of the first sub-light source is larger than an opening size of the transmissive hole of the second sub-light source.

17. An optical detection device, comprising:

a detection workspace, configured to hold a target workpiece under detection;

a first image acquisition device, configured to acquire an image of the target workpiece along a first direction, the first direction is perpendicular to a plane in which the detection workspace is located;

a plurality of second image acquisition devices, configured to acquire an image of the target workpiece along directions different from the first direction;

a detection light source, configured to provide detection light for the first image acquisition device and the second image acquisition device, and comprising a first sub-light source and a second sub-light source, the second sub-light source comprising a plurality of bar-shaped light sources and configured to provide the detection light incident on a lateral surface of the target workpiece; and a conveyor, configured to convey the target workpiece into or out of the detection workspace;

wherein:

an optical axis of the detection light provided by the first sub-light source of the detection light source is coaxial with an optical axis of the first image acquisition device;

in a plane perpendicular to the first direction, projections of the plurality of second image acquisition devices and projections of the plurality of bar-shaped light sources are alternately arranged along a circle around a center of the detection workspace at a uniform interval;

an angle between the optical axis of the first image acquisition device and an optical axis of the detection light provided by the second sub-light source is smaller than an angle between the optical axis of the first image acquisition device and an optical axis of one of the plurality of second image acquisition devices; and the first image acquisition device, the first sub-light source, the second sub-light source and the second image acquisition device are arranged in sequence from top to bottom in the first direction.

\* \* \* \* \*